United States Patent [19]

Balduff et al.

[11] Patent Number: 4,714,741
[45] Date of Patent: Dec. 22, 1987

[54] DEGRADABLE POLYMER COMPOSITION

[75] Inventors: Dennis C. Balduff, Toledo; Saleh A. Jabarin, Holland, both of Ohio

[73] Assignee: Owens-Illinois Plastic Products Inc., Toledo, Ohio

[21] Appl. No.: 919,981

[22] Filed: Oct. 17, 1986

Related U.S. Application Data

[63] Continuation-in-part of Ser. No. 856,638, Apr. 25, 1986, abandoned, which is a continuation of Ser. No. 726,487, Apr. 24, 1985, abandoned, which is a continuation of Ser. No. 524,279, Aug. 18, 1983, abandoned.

[51] Int. Cl.$^4$ ............................................. C08L 23/06
[52] U.S. Cl. .................................................... 525/185
[58] Field of Search ............................................. 525/185

[56] References Cited

U.S. PATENT DOCUMENTS

| | | | |
|---|---|---|---|
| 3,248,359 | 4/1966 | Maloney | 525/185 |
| 3,741,421 | 6/1973 | Wittwer | 215/217 |
| 3,778,096 | 12/1973 | Smith | 206/150 |
| 3,860,538 | 1/1975 | Guillet et al. | 525/214 |
| 3,865,302 | 2/1975 | Kane | 229/43 |
| 3,929,727 | 12/1975 | Russell et al. | 524/612 |
| 3,948,404 | 4/1976 | Collins | 215/1 C |
| 3,968,082 | 7/1976 | Hudgin | 524/302 |
| 4,139,094 | 2/1979 | Berry et al. | 206/158 |
| 4,372,311 | 2/1983 | Potts | 128/156 |
| 4,623,581 | 11/1986 | Hert | 525/185 |

FOREIGN PATENT DOCUMENTS

| | | | |
|---|---|---|---|
| 1000000 | 11/1976 | Canada | 220/DIG. 30 |
| 2316697 | 10/1973 | Fed. Rep. of Germany | 220/DIG. 30 |

OTHER PUBLICATIONS

"Escorene Linear low density polyethylene resins," *Exxon Chemicals*, 9 pages, No Date, No Author.

*Primary Examiner*—Carman J. Seccuro
*Attorney, Agent, or Firm*—H. G. Bruss

[57] ABSTRACT

A degradable polymer composition having
(a) an ethylene-carbon monoxide copolymer only in an amount sufficient to provide a total of substantially about 0.005 to 0.05 percent by weight of CO in the composition; and
(b) a low density polyethylene.

1 Claim, 1 Drawing Figure

FIG. 1

Legend:
- ○ — 2.5% ECO
- △ — 1.0% ECO
- □ — 0.5% ECO
- × — 100% LDPE
- ■ — 5% ECO
- ● — 25% ECO
- ▲ — 100% ECO X-axis: UV EXPOSURE TIME (EQUIVALENT IN MONTHS)
Y-axis: % ELONGATION

DEGRADABLE POLYMER COMPOSITION

This application is a continuation-in-part application of Ser. No. 856,638 filed Apr. 25, 1986; now abandoned, Ser. No. 856,638, being a continuation application of Ser. No. 726,487 filed Apr. 24, 1985, now abandoned, which, in turn, is a continuation of Ser. No. 524,279 filed Aug. 18, 1983, now abandoned.

BACKGROUND OF THE INVENTION

The present invention relates to environmentally degradable articles, films, bags together with containers fabricated from the degradable polymeric compositions.

A wide variety of environmentally degradable polymeric compositions have been used for the fabrication of containers, films, bags and the like in the past. Many of these polymeric compositions required the use of photosensitive additives to a host polymer to impart environmental degradability to the articles, particularly by photodegradation mechanisms. The use of such additive systems have caused substantial problems in the past. For example, such polymer-photosensitive additive systems have exhibited spontaneous separation of the components or component migration to surface of the article during and after melt extrusion. Further, such additive systems are often subject to discoloration or odor generation during processing of the melt. This requires the addition of dye colorants to maintain an acceptable product appearance. Further, such systems have had poor extrusion viscosity characteristics and poor thermoformability and have not exhibited the requisite stiffness or flexibility for certain applications.

In the past, a blended material of high density polyethylene or medium density polyethylene admixed with an ethylene-carbon monoxide copolymer in the concentrations of 3-50 percent ethylene-carbon monoxide copolymer, wherein the mixture contains about 0.1 to about 15 weight percent of carbon monoxide has been used for various articles. Such a degradable polyethylene ethylene-carbon monoxide copolymer material is described in German patent document No. 2316697 entitled "Polymeric Substance Photo-Decomposable By the Action of Ultraviolet Irradiation."

The material disclosed in German patent document No. 2316697 is limited to high density polyethylene and medium density polyethylene having between 3-50 percent ethylene-carbon monoxide copolymer and discloses the use of copolymers of ethylene-propylene, ethylene-butene, ethylene-vinylacetate, ethylene-styrene, ethylene-methylacrylate and ethylene-hexene copolymers in the place of polyethylene. The polyethylene-ethylene-carbon monoxide blended materials disclosed in the German patent document No. 2316697 degrades too rapidly for successful use in articles requiring flexibility. Accordingly, there exists a need in the art for an environmentally degradable polymeric composition having sufficient mechanical properties for use as an article which exhibits balanced environmental degradation, excellent mechanical properties, extrudability, thermoformability and does not spontaneously suffer component migration or separation upon melt extrusion formation or during use.

SUMMARY OF THE INVENTION

The present invention comprises a degradable polymeric composition and films prepared from such polymeric composition. The articles according to the present invention are useful as filmstock.

An embodiment of the invention comprises an admixture of low density polyethylene and ethylene-carbon monoxide copolymer. For degradable carrier uses, the ethylene-carbon monoxide copolymer comprises between 0.01 and 9.99 percent by weight of the mixture.

The present invention provides a degradable polymer composition comprising: (a) an ethylene-carbon monoxide copolymer only in an amount sufficient to provide a total of substantially about 0.005 to 0.05 percent by weight of CO in the composition; and (b) a low density polyethylene constituting substantially the balance of the composition.

BRIEF DESCRIPTION OF THE DRAWING

The details of the invention will be described in the accompanying specification in view of the drawings, in which:

FIG. 1 shows the curves of time of light exposure versus percent of elongation for various admixtures by percentage compositions illustrating degradation behavior of the compositions of low density polyethylene and ethylene-carbon monoxide copolymer.

DESCRIPTION OF THE INVENTION

The present invention comprises degradable polymeric compositions and articles prepared therefrom, which articles are particularly suitable for use as film.

The degradable polymeric compositions according to the present invention show improved processing characteristics, including the capability to be formed by extrusion, thermoforming, injection blow molding, stretch blow molding, extrusion blow molding and molding as part of a multilayer material composition. The compositions also show improved thermoformability, improved resistance to spontaneous delamination of the admixed component materials; a balanced environmental degradation characteristic, as well as low cost of production compared to conventionally available degradable polymeric resinous material compositions.

As used herein, the term "low density polyethylene" is defined as a homopolymer of ethylene having a melt index of 0.30 G/10 min and above; a density of between 0.910 grams/cc and 0.935 grams/cc; an ultimate elongation of at least 500 percent; and a tensile strength of 2,200 psi and above.

As used herein, the term "ethylene-carbon monoxide copolymer" is defined as a copolymer of ethylene and carbon monoxide having a melt index of between 0.6 G/10 min and 1.3 G/10 min a density of between 0.925 grams/cc and 0.935 grams/cc; an ultimate elongation of about 500 percent; a tensile strength of between 2,200 psi and 2,500 psi; and a carbon monoxide content of about one weight percent of the copolymer. Obviously, any ethylene-carbon monoxide copolymer having more than about one weight percent carbon monoxide can be used in smaller quantities to supply equivalent amounts of the carbon monoxide moiety.

A preferred ethylene-carbon monoxide copolymer, useful for all embodiments of the present invention, is that material supplied by Union Carbide Corporation as product DHDG-4164 ECO. The ethylene-carbon monoxide copolymer supplied by Union Carbide Corporation has the following physical properties: a melt index of 1.2 G/10 min.; a density of 0.934 grams/cc; an ultimate elongation of 520%; a tensile strength of 2250 psi and a carbon monoxide content of a range of 0.7 to 1.1 percent carbon monoxide over the entire range.

With all embodiments of the invention, it is preferred to use granular polymers for admixing together by any conventional means to form the proper weight percent of the appropriate polymers mixed with the ethylene-carbon monoxide copolymer. Typically, the granules of separate components of the admixture are mixed together in a granule mixer to form a homogeneous granular feedstock. The granular feedstock is processed by extrusion or similar processing to form sheets, tubes or container parisons which are then converted into final products by the methods described above. Preferably, additional mixing occurs during the melting and forming process to assure a nearly homogeneous polymeric blend which is processed according to the methods described above to form the final desired articles according to the present invention.

Granular blending is preferably accomplished with a multiple compartment, belt-fed Whitlock Blender, equipped with a mixing bar. Granular mix is fed to the extruder by pneumatic tube transport. To form melt extruded sheetstock, a Davis-Standard Thermatic extruder, equipped with System 101 controller and 6 inch screw, with an L/D=34, fed to a Kenics mixer and 80 inch autoflex die is preferably used to extrude the sheetstock.

An embodiment of the present invention relates to compositions of matter comprising admixtures of low density polyethylene with ethylene-carbon monoxide copolymer. Such compositions provide an admixture which is environmentally degradable and exhibit the excellent processability characteristics described above for the fabrication of film.

What is claimed is:
1. A degradable polymer composition comprising:
   (a) an ethylene-carbon monoxide copolymer only in an amount sufficient to provide a total of substantially about 0.005 to 0.05 percent by weight of CO in the composition; and
   (b) a low density polyethylene constituting substantially the balance of the composition.

* * * * *